Sept. 1, 1959 R. G. MORK 2,902,684

SIGNALING SYSTEM

Filed Aug. 8, 1956 2 Sheets-Sheet 1

INVENTOR.
RALPH G. MORK

BY G. R. Gugger
AGENT

United States Patent Office 2,902,684

Patented Sept. 1, 1959

2,902,684

SIGNALING SYSTEM

Ralph G. Mork, Vestal, N.Y., assignor to International Business Machines Corporation, New York, N.Y., a corporation of New York

Application August 8, 1956, Serial No. 602,783

10 Claims. (Cl. 340—324)

This invention relates to signaling systems and is more particularly directed to a system for converting serial binary data received over a single line into appropriate signals for a cathode ray tube or the like.

In the transmission of digital data in serial form it is frequently necessary to provide a means of synchronizing the receiving equipment which, for instance, may be required to store an incoming word in a register or accumulator. Since the data is serial in nature and is represented by the presence or absence of 1's, a system must be provided which will recognize the absence of a 1 as being a 0 in the transmitted data, rather than merely benig the gap between adjacent 1's. The recognition of 0's in data being transmitted within a computer is easily accomplished through the use of a central clock or synchronizer pulse generator which feeds not only the part of the computer originating the serial data, but also the part of the computer receiving the data. In cases where the data is transmitted over a distance, two methods are familiar in the art. The first method utilizes two wires, one of which carries the data pulses, while the other carries the synchronizing pulses. The second method involves the use of one wire and a second synchronizing generator at the receiving end. In this second case, it is necessary for the data transmitter to maintain a fairly accurate time interval between pulses. The synchronizer at the receiving end must be made to generate synchronizing pulses at a time closely approximating that of the synchronizer in the transmitter. Furthermore, the receiving synchronizer must be coherent. In other words, the phase angle of the receiver synchronizing pulses must be sensibly zero relative to the transmitting synchronizer. Also, if there is a time delay in the transmission of the data over a long wire, this same time delay must be included in the receiving synchronizer. The relationship of the receiver synchronizing to the incoming data pulses must be maintained constant even though there are variations in the transmitted pulse separation interval and even though the initiation of trains of data pulses occurs at a random time.

In accordance with the present invention, there is provided an arrangement for transmitting both data pulses and synchronizing pulses over a single wire. Means are provided for combining the data pulse information with the synchronizing pulse information at the transmitter and for separating the data pulses from the synchronizing pulses at the receiver. The synchronizing pulses are utilized to drive a distributor which sets up one side of an "and" circuit and the data pulses are fed into the other side of the "and" circuit. The "and" circuit registers the digital output in suitable flip-flop after which the digital information is converted to an analog voltage for use in controlling a cathode ray tube or the like, or as direct data for use in a computer. This arrangement is an improvement in the art since only one input line to the system is required with the carrier wave serving as the timer and thus eliminating the necessity for the usual combination of a timing oscillator and gate means required to tie the oscillator and input signal together. The present single line system will have a greater accuracy of input information due to the input data and the timing signals being tied together with a fixed relationship.

Accordingly, the principle object of the present invention is to provide a system for converting serial binary data received over a single line into appropriate signals for controlling a cathode ray tube or the like.

A further object of the present invention is to provide a system as in the preceding object and having means for combining data pulse information with synchronizing pulse information at the transmitter and means for separating the data pulses from the synchronizing pulses at the receiver.

A further object of the present invention is to provide a system wherein serial binary data received over a single line is split into binary 1 pulses and synchronizing pulses and circuit means are provided under control of said split pulses for producing an analog voltage representative of the serial binary input data.

Other objects of the invention will be pointed out in the following description and claims and illustrated in the accompanying drawings, which disclose, by way of example, the principle of the invention and the best mode, which has been contemplated, of applying that principle.

Figure 2:
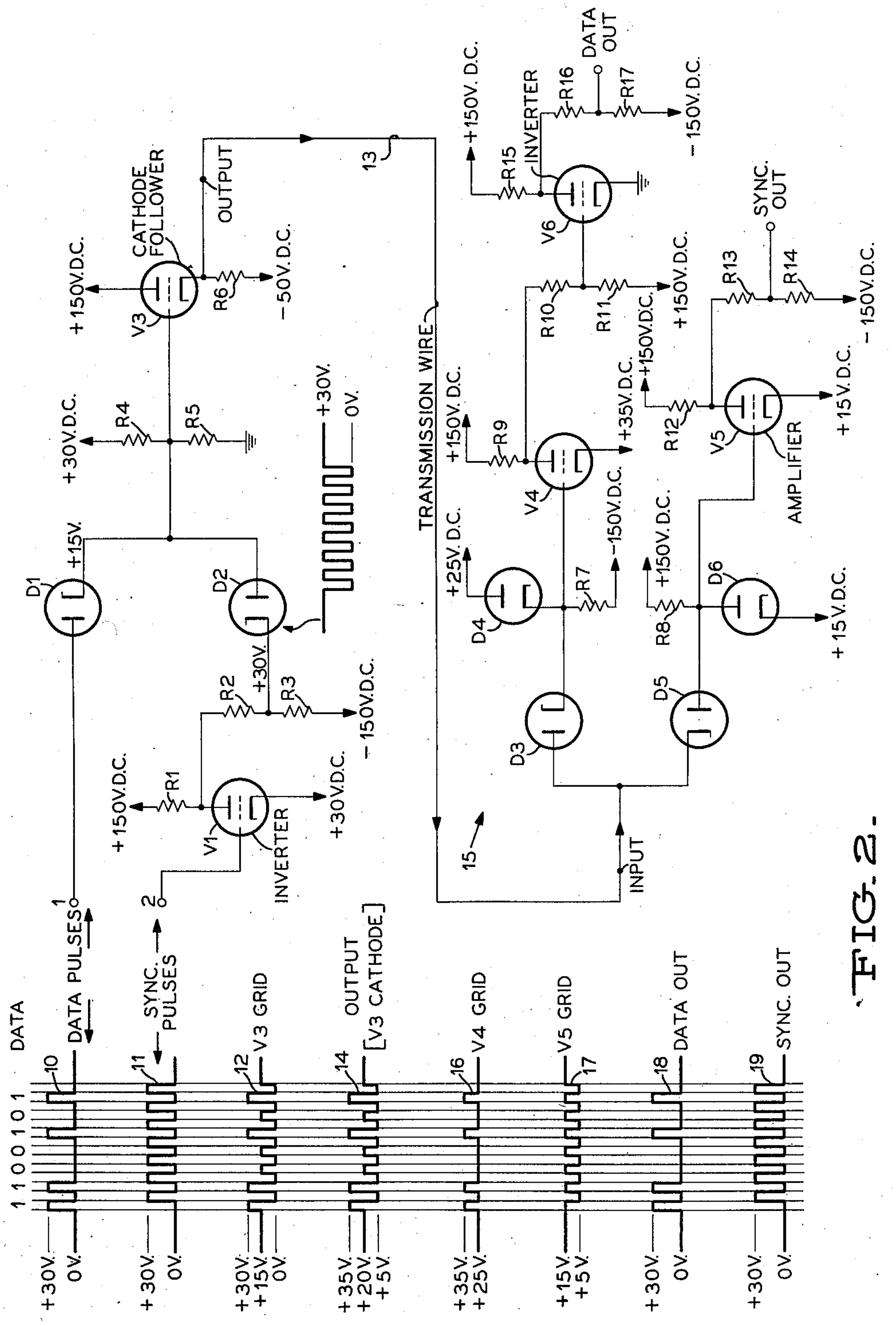
Fig. 2 is a detailed showing of one arrangement for providing the data and synchronizing pulses for the control apparatus of the invention.

Referring to Fig. 2, there is shown a preferred arrangement for combining the data pulses and synchronizing pulses at the transmitter end of the system for single wire transmission and the preferred arrangement for separating the data and synchronizing pulses at the receiver end of the system. There are other circuit arrangements which would perform the same function and the particular circuits illustrated are subject to many variations insofar as voltage levels are concerned. The particular voltage levels indicated are included only for purposes of illustration and the pulse polarities and amplitudes are a matter of choice.

For purposes of illustration, a typical train of data pulses 10 is shown in the upper left-hand corner of Fig. 2. There are, of course, many choices of code to suit a particular application and the one shown is a 7-bit code commonly employed in digital computers. Shown directly underneath the data pulse train is a train of 7 synchronizing pulses 11 which would commonly be associated with the aforementioned 7-bit code. Assume, as an example, that a 1 is represented by a level of plus 30 volts and a 0 by a level of 0 volts as indicated on the wave form in Fig. 2.

The data pulses at the transmitter drive a diode D1 which has its cathode biased by means of a divider network R4, R5. The biasing level, which is shown as plus 15 volts, is chosen so as to bias the diode in the reverse direction when no data pulses are present. As the leading edge of a data pulse raises the plate of diode D1, the diode will begin to conduct when the data pulse reaches a level of plus 15 volts. The diode cathode will be pulled up by the incoming pulse and will reach a maximum level of plus 30 volts. At the trailing edge of the data pulse the reverse action occurs. In other words, the diode cathode falls with the data pulse until the pulse reaches the plus 15 volt level at which time the diode ceases conduction.

The synchronizing pulses are applied to the grid of tube V1. This tube functions as an inverter, producing an amplified inverted signal across its plate resistor R1. V1 is normally in the cutoff condition due to the fact that its cathode is maintained at plus 30 volts. Therefore, the plate of V1 is normally at a high potential determined by the voltage drop across resistor R1 due to the amount of current flowing through resistors R2 and R3. This resistor network is adjusted to produce a plus 30 volt level at the cathode of diode D2 when V1 is in the cutoff condition. As a sync pulse leading edge is applied to the grid of V1, a voltage level will be reached where the tube starts to conduct, the level depending upon the particular choice of tube used. When the sync pulse reaches the full amplitude of plus 30 volts, tube V1 will be at zero bias and will be fully conducting. Under these conditions, the plate potential will drop and via the divider network R2, R3, the cathode of diode D2 will drop. The level to which the diode cathode drops is determined by the particular values assigned to resistors R1, R2 and R3 and tube V1. For the present example, the circuit would be designed so that the cathode of diode D2 drops to zero volts. The net result of the use of tube V1 as an inverter is to produce a sync pulse signal having a base line of plus 30 volts with the pulse going to zero volts on the cathode of diode D2. The action of diode D2 is similar to that of D1. As the inverted sync pulse leading edge drops to a potential of plus 15 volts, diode D2 begins to conduct, thus pulling the grid of a tube V3 down with it. When the inverted sync pulse reaches its full amplitude of zero volts, the grid of V3 will also be at zero. The result of the combined action of data pulses and sync pulses produces a combined signal on the grid of V3 as shown by the wave form 12 at the left of Fig. 2.

Tube V3 is employed as a cathode follower in order to avoid loading the diode circuitry and also to provide power to drive the transmission wire. Depending upon the power available from the cathode follower, the stray capacitance of the transmission wire, and the required rise and fall times, the transmission wire may be made indefinitely long. It should be understood that a common ground path must exist between the output of the transmitter and the input to the receiver circuit. This may be via "earth" or for greater distances via an additional wire or the shield which may be used on the signal wire 13.

The signal appearing at the output from the cathode of V3 and therefore, also appearing on the transmission wire 13 is shown by the wave form indicated at 14. The upward shift of 5 volts at each of the signal levels is to be expected because of the action of cathode follower V3. The magnitude of the shift is, of course, dependent upon the particular cathode follower circuit used.

At the receiving end of the transmission wire the signal is fed into a splitter circuit indicated generally by the numeral 15. The signal 14 is applied directly to the plate of a diode D3 and the cathode of a diode D5. Diode D3 has its cathode biased to plus 25 volts through the action of a diode D4 and resistor R7. When an incoming data pulse raises the plate of diode D3 above plus 25 volts, the diode begins to conduct and the cathode of the diode will follow the incoming data pulse up to its maximum amplitude of plus 35 volts. Diode D4 is reverse biased during the time that the data pulse is above the plus 25 volt level and therefore does not conduct. As the data pulse drops, the cathode of D3 follows the pulse down until the plus 25 volt level is reached due to the action of R7, which is connected to a negative voltage. When plus 25 volts is reached, diode D4 again conducts and holds the cathode of D3 at plus 25 volts; therefore, the further drop of the data pulse below plus 25 volts has no effect. The foregoing action results in a normal grid level of plus 25 volts on the grid of a tube V4 with the pulse driving the grid of V4 up to plus 35 volts. It will be noted that the negative going sync pulses which drop to a level of plus 5 volts have no effect on the grid of tube V4 due to the fact that diode D3 is reverse biased. The net result is that only the data pulse component of the transmitted signal reaches the grid of V4. The wave form is indicated at 16.

In like manner, diode D5 transmits only the sync pulses to the grid of a tube V5. The plate of D5 is normally at a level of plus 15 volts through the action of a diode D6 and a resistor R8. Any voltage level on the input which is more positive than plus 15 volts will not have any effect on the grid of V5 because the diode is reverse biased. When the incoming sync pulse component drops below plus 15 volts, diode D5 begins to conduct and pulls the grid of V5 down to the final sync pulse level of plus 5 volts. During this time diode D6 is reverse biased and, therefore, does not affect the circuit. As the trailing edge of the sync pulse rises, the grid of V5 is pulled up through the action of resistor R8 which is returned to a positive potential. Therefore, the grid of V5 follows the sync pulse whenever the sync pulse is in the voltage range of plus 15 volts to plus 5 volts. As the trailing edge reaches plus 15 volts, diode D6 again conducts and holds the grid of V5 at a plus 15 volt potential. The remainder of the trailing edge of the sync pulse does not reach the grid, since diode D5 has become reverse biased again. It will be noted that the circuit produces a separation of the transmitted combined signal in such a manner as to place only the data pulses on the grid of V4 and only the sync pulses on the grid of V5. The wave form of sync pulses is indicated at 17.

The tubes V4 and V5 are used for amplifying the signal since the grid signals on these tubes have only a 10 volt change in amplitude. These changes may not be necessary if the subsequent receiving equipment will function satisfactorily on 10 volt signals. Tube V5 is also used since the separated sync pulses are negative going whereas the input sync pulses to tube V1 had the same polarity as the data pulses, which is conventional in many computers. Again the polarity of these pulses may not require reversal after separation if the digital equipment being used does not require it. For this example, however, tubes V4, V5 and V6 have been included and these stages function as amplifiers having their cathodes returned to appropriate levels relative to the voltage levels on their grids. Proper choice of the divider networks R10, R11 and R13, R14 will permit establishing the output signals from the separator circuit to conform to, for example, a base level of zero volts with the pulse amplitude of plus 30 volts as indicated by the data out wave form 18 and the sync out wave form 19. It will be noted that the use of tube V4 also inverts the polarity of the data pulse and it is, therefore, necessary to include a similar inverter stage V6 to re-establish the polarity of the signal. Resistors R15, R16 and R17 are chosen in conjunction with V6 to give the desired data output level and amplitude.

The input signals to the separator circuit do not act on the diodes until a signal amplitude of 5 volts excursion from the normal 20 volt level is reached. This results in the separator circuit discriminating against noise pulses on the transmission wire as long as the noise pulses do not reach an amplitude greater than 5 volts in either direction from plus 20 volts. The choice of plus 5 volts as a noise discrimination level is purely arbitrary and can be changed by choice of other values of voltage on the plate of D4 and the cathode of D6. It should, of course, be understood that as this noise discrimination level is increased, the amplitude of the signal reaching tubes V4 and V5 is decreased.

A sync separator can also be used which employs other types of amplitude sensitive circuits. For example, a differential amplifier can be used which is set to switch at plus 25 volts. This differential amplifier will then produce output signals only from data pulses. Similarly, a second differential amplifier which is set to switch at plus 15 volts can be used to produce the sync pulses.

In accordance with the invention, there is shown in Fig.

1 an arrangement for converting the data received over a single line into appropriate signals for a cathode ray tube. For purposes of illustration, there is shown a cathode ray tube 20 of the character display type commonly employing a character matrix. This type of tube is well known and hence it is not believed necessary to describe it in detail. Suffice to say that this type of tube includes a character mask or matrix 21 on which the electron beam is selectively positioned by the horizontal and vertical deflection plates 22 and 23. The character mask accordingly shapes the beam into the form of a selected character which is positioned on the screen of the tube by means of the positioning plates 24, 25.

Figure 1:
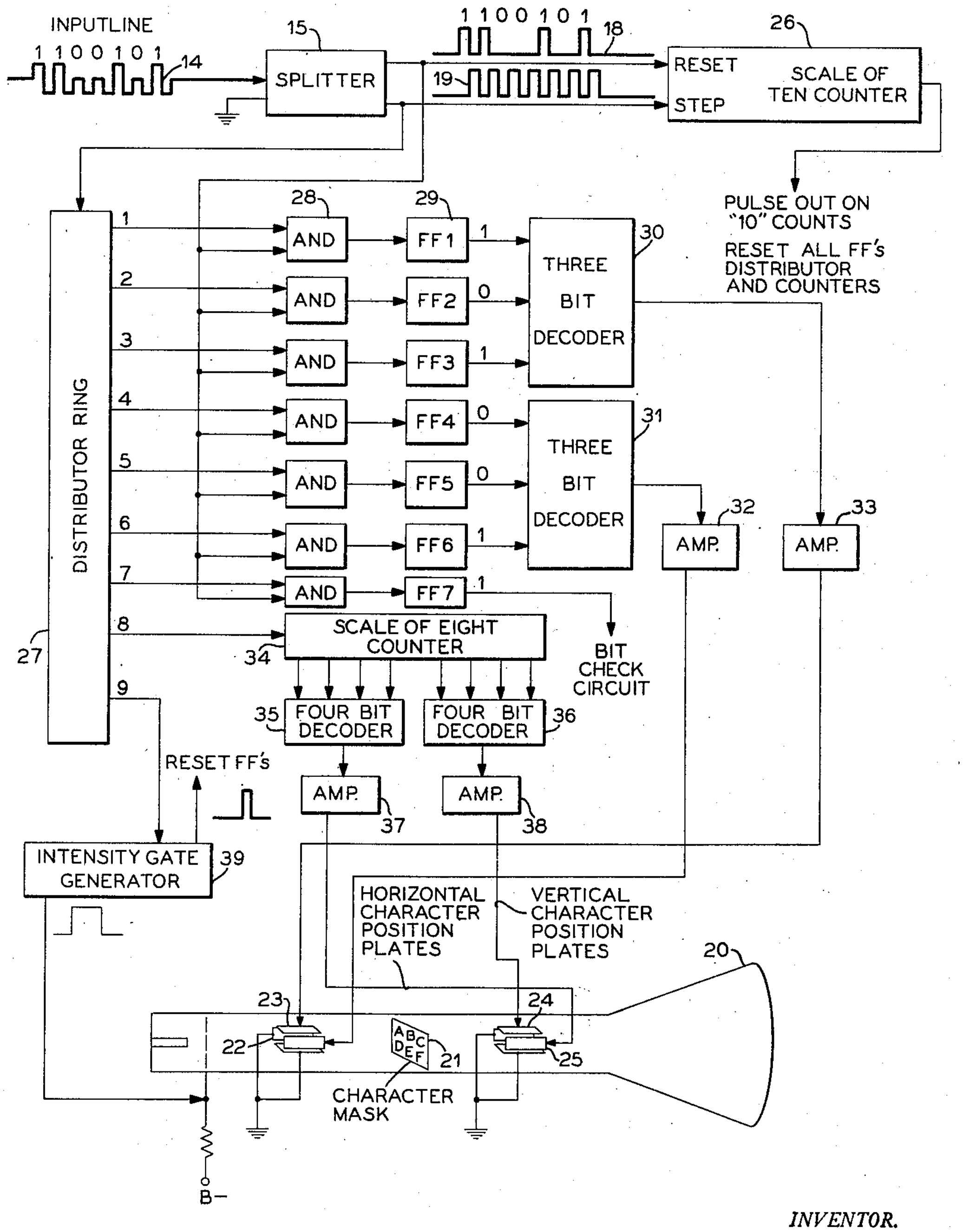
Fig. 1 is a simplified diagram showing the control apparatus of the present invention.

As indicated in Fig. 1, the receiving equipment is supplied with the train of data pulses 18 having a positive going pulse included to denote a "1" and omitted to denote a "0" and a train of sync pulses 19. Initially the receiving equipment is cleared to zero by sending 10 "0's" and utilizing the sync pulses to advance a conventional 10 stage electronic counter 26 whereupon the counter will emit a reset signal which may be suitably transmitted to the various sections of the receiving equipment. To prevent clearing during receipt of data the counter 26 is reset whenever a "1" data pulse is received.

As shown, the sync pulses are fed to a distributor 27 which may take the form of a conventional 9 stage linear electronic ring counter. The output from each of the first 7 stages of the distributor is shown connected to one side of a related "and" circuit indicated by the individual blocks 28. The other side of each "and" circuit is connected to receive the data pulses. The individual "and" circuits 28 may take the form of coincidence tubes each having two input grids and one output plate and it can be readily understood that as the sync pulses step the distributor 27 through stages 1, 2 . . . 7, the outputs from these stages are utilized to drive the related grid of each coincidence tube positive.

As the distributor outputs sequentially activate one set of grids of the coincidence tubes the positive data pulses 18 are feeding into the other grids of the tubes to drive these grids positive and the combination of a positive data pulse and a distributor output pulse on the two grids of any one of the coincidence tubes will cause that particular tube to conduct.

The individual plate outputs of the coincidence tubes ("and" blocks 28) are each shown connected to an associated conventional flip-flop circuit indicated by the blocks 29. Thus, it will be understood that those flip-flops receiving an output from the "and" circuits will be set to register a "1" and the remaining flip-flops will register "0."

The receiving equipment described thus far has functioned to convert the serial binary input data into parallel and put it in storage. The parallel data is then fed out of storage into suitable decoders which function to convert the digital information to a corresponding analog voltage. In the present example, the flip-flops FF1–FF6 holding the first 6 code bits are shown connected to two three bit decoders 30, 31. It will be noted that the seventh bit held by FF7 is fed to a bit check circuit which is not shown and will not be described since it forms no part of the present invention. It is common practice in computer systems to utilize the first 6 bits of a code for information purposes and to generate a seventh bit which is used to check the accuracy of the coded information.

The three bit decoders may comprise any suitable digital to analog conversion circuitry as, for example, the type shown and described in the University of Pennsylvania publication of June 1948, titled "Theory and Technique for Design of Electronic Digital Computers" whereby any one or combination of the flip-flops FF1–FF6 set in accordance with some coded system, such as the 7-bit binary code shown, would excite one or more switching tubes which in turn would switch into an attenuator network the plate outputs of one or more constant current sources. The attenuator weights the current sources in accordance with the code established for setting the flip-flops and a linear summation of currents results which, acting across the impedance of the network, produces a voltage proportional to the value of the input. As shown in Fig. 1, the analog voltage outputs from the decoders are amplified by suitable amplifiers 32, 33, and directed to the horizontal and vertical deflection plates 22, 23, of the cathode ray tube to deflect the beam to the desired character on the matrix 21.

The output from stage 8 of the distributor 27 is utilized to step a conventional 8 stage linear electronic counter 34 to determine the character position. In other words, the counter will be stepped once for each 7-bit character code received and the counter output is converted to a suitable voltage by the two four bit decoders 35, 36, which may take the same form as the three bit decoders just described. The voltage outputs from the four bit decoders are amplified by suitable amplifiers 37, 38, and directed to the horizontal and vertical positioning plates 24, 25, to position the character across the screen of the cathode ray tube.

The output from stage 9 of the distributor 27 is taken to a write gun intensity gate generator 39 which turns on the beam of the cathode ray tube to display the selected character in the determined position. The generator provides a reset pulse for the flip-flops FF1–FF7 to erase the stored character in preparation for receiving the next one. The reset pulse is timed to start at the trailing edge of the intensification gate.

One of the significant features of the present system is that data from a computer may be sent out over a single telephone line by means of, for example, a 1600 cycle A.C. signal having the positive half-cycle omitted for a "0" and included for a "1," and the data viewed in a remote office on a storage screen type of cathode ray tube of the character display type having matrix formed characters on the storage screen which can be read easily at normal office illumination levels. Push button controls could be provided to erase the stored image after viewing and it appears quite feasible that a keyboard with digital data sending equipment could be provided to permit sending requests over the same telephone line to the computer for specific data.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A signaling system of the class described comprising, means for combining serial coded data pulses and synchronizing pulses for transmission over a single line, means for receiving said combined pulses and for separating same into a train of serial coded data pulses and a train of synchronizing pulses, a plurality of "and" circuit devices arranged in parallel, means for conditioning one side of said devices in accordance with said synchronizing pulses, means for conditioning the other side of said devices in accordance with said data pulses, said devices producing parallel outputs representative of said serial data pulse train, means for storing the outputs from said devices, and means for decoding the stored data pulses into corresponding signal voltages.

2. A signaling system of the class described comprising, means for combining serial coded data pulses and synchronizing pulses for transmission over a single line, means for receiving said combined pulses and for separating same into a train of serial data pulses, wherein the presence of a pulse denotes a "1" and the absence of a pulse denotes a "0," and a train of synchronizing pulses, a plurality of "and" circuit devices arranged in parallel, means for conditioning one side of each of said devices in sequence in accordance with said synchronizing pulses, means for conditioning the other side of said devices in sequence depending upon the presence or absence of a pulse in said data pulse train, said devices producing parallel outputs representative of said serial data pulse train, means for storing the outputs from said devices, and means for decoding the stored data pulses into corresponding signal voltages.

3. A signaling system of the class described comprising, means for combining serial coded data pulses and synchronizing pulses for transmission over a single line, means for receiving said combined pulses and for separating same into a train of serial coded data pulses and a train of synchronizing pulses, an electronic distributor network under control of said pulse trains for arranging said serial coded data pulses in parallel fashion, register devices controlled by said distributor network for storing said parallel coded data pulses, and decoding means under control of said register devices for producing signal voltages corresponding to the value of said coded data pulses.

4. A signaling system of the class described comprising, means for combining serial coded data pulses and synchronizing pulses for transmission over a single line, means for receiving said combined pulses and for separating same into a train of serial coded data pulses and a train of synchronizing pulses, an electronic distributor under control of said train of synchronizing pulses, a plurality of "and" circuit devices arranged in parallel and under control of both said distributor and said train of serial coded data pulses for arranging said data pulses in parallel fashion, register devices controlled by said "and" circuit devices for storing said parallel coded data pulses, and decoding means under control of said register devices for producing signal voltages corresponding to the value of said coded data pulses.

5. A signaling system of the class described comprising, means for combining serial coded data pulses and synchronizing pulses for transmission over a single line, means for receiving said combined pulses and for separating same into a train of serial coded data pulses and a train of synchronizing pulses, an electronic counter under control of said train of synchronizing pulses, said counter having a plurality of output stages, a plurality of "and" circuit devices arranged in parallel, each of said devices having an input connected to a related stage of said counter, an input connected to said train of serial coded pulses, and an output, said "and" devices operating to arrange said data pulses in parallel fashion, a plurality of register devices arranged in parallel and connected to the outputs of said "and" devices for storing said parallel coded data pulses, and decoding means under control of said register devices for producing signal voltages corresponding to the value of said coded data pulses.

6. A signaling system of the class described comprising, means for combining serial coded data pulses and synchronizing pulses for transmission over a single line, means for receiving said combined pulses and for separating same into a train of serial data pulses, wherein the presence of a pulse denotes a "1" and the absence of a pulse denotes a "0," and a train of synchronizing pulses, an electronic counter responsive to said synchronizing pulses for producing parallel output pulses in sequence, a plurality of "and" circuit devices arranged in parallel and sequentially controlled by the output pulses from said counter and said train of serial data pulses, those devices receiving both a synhcronizing pulse and a "1" pulse operating to produce output pulses in parallel representative of the serial data, a plurality of flip-flop devices arranged in parallel and controlled by the output pulses from said "and" devices to represent a "0" or a "1," and means controlled by said flip-flops for converting the stored data pulses to a corresponding analog voltage.

7. A system for controlling a cathode ray tube having beam generating means, beam deflecting means, and means for positioning the deflected beam comprising, means for combining serial coded data pulses and synchronizing pulses for transmission over a single line, means for receiving said combined pulses and for separating same into a train of serial coded data pulses representative of individual characters and a train of synchronizing pulses, means for arranging the serial data pulses representing a character in parallel, means for storing said parallel arranged data pulses, means for converting said parallel data pulses into a signal voltage representative of the character stored, means for operating said beam deflecting means by said signal voltage, means responsive to said synchronizing pulses for generating a second signal voltage after each character is received, means for operating said beam positioning means by said second signal voltage, and means responsive to said synchronizing pulses for operating said beam generating means after each character is received.

8. A system for controlling a cathode ray tube having beam generating means, beam deflecting means, and means for positioning the deflected beam comprising, means for combining serial coded data pulses and synchronizing pulses for transmission over a single line, means for receiving said combined pulses and for separating same into a train of serial coded data pulses representative of individual characters and a train of synchronizing pulses, a distributor network for arranging the serial data pulses representing a character in parallel, said network including an electronic counter responsive to said train of synchronizing pulses and having a plurality of output stages, means for storing said parallel arranged data pulses, means for converting said parallel data pulses into a signal voltage representative of the character stored, means for operating said beam deflecting means by said signal voltage, means responsive to an output stage of said counter for generating a second signal voltage after each character is received, means for operating said beam positioning means by said second signal voltage, and means responsive to another output stage of said counter for operating said beam generating means after each character is received.

9. A signaling system of the class described comprising, means for combining groups of serial coded data pulses representing characters and synchronizing pulses for transmission over a single line, means for receiving said combined pulses and for separating same into a train of serial coded data pulses and a train of synchronizing pulses, a plurality of "and" circuit devices arranged in parallel, stepping means for conditioning one side of said devices in accordance with said synchronizing pulses, means for conditioning the other side of said devices in accordance with said data pulses, said devices producing parallel outputs representative of a group of serial data pulses defining a character, means for storing the outputs from said devices, means for decoding the stored data pulses into signal voltages corresponding to the value of the character stored, and means under control of said stepping means for producing other signal voltages after each character is decoded.

10. A signaling system of the class described comprising, means for combining groups of serial coded data pulses representing characters and synchronizing pulses for transmission over a single line, means for receiving said combined pulses and for separating same into a train of serial coded data pulses and a train of synchronizing pulses, an electronic counter advanced under control of said train of synchronizing pulses, said counter having a plurality of output stages, a plurality of "and" circuit devices arranged in parallel, each of said devices having an input connected to a related stage of said counter, an input connected to said train of serial coded pulses, and an output, said "and" devices operating to arrange said data pulses in parallel fashion a character at a time, a plurality of register devices arranged in parallel and connected to the outputs of said "and" devices for storing said parallel coded data pulses, decoding means under control of said register devices for producing signal voltages corresponding to the value of the character stored, a second electronic counter controlled by an output stage of said first counter to advance after each character is decoded, and decoding means under control of said second counter for producing signal voltages.

References Cited in the file of this patent

UNITED STATES PATENTS

| | | |
|---|---|---|
| 2,256,529 | Seeley | Sept. 23, 1941 |
| 2,724,739 | Harris | Nov. 22, 1955 |
| 2,731,631 | Spaulding | Jan. 17, 1956 |
| 2,761,988 | McNaney | Sept. 4, 1956 |
| 2,777,745 | McNaney | Jan. 15, 1957 |